(12) United States Patent
Weitzman

(10) Patent No.: US 10,957,217 B2
(45) Date of Patent: Mar. 23, 2021

(54) POPULATION-SAMPLE REGRESSION IN THE ESTIMATION OF POPULATION PROPORTIONS

(76) Inventor: Ronald A. Weitzman, Carmel, CA (US)

(*) Notice: Subject to any disclaimer, the term of this patent is extended or adjusted under 35 U.S.C. 154(b) by 503 days.

(21) Appl. No.: 11/845,677

(22) Filed: Aug. 27, 2007

(65) Prior Publication Data
US 2008/0133174 A1    Jun. 5, 2008

Related U.S. Application Data

(60) Provisional application No. 60/823,625, filed on Aug. 25, 2006.

(51) Int. Cl.
*G09B 19/00* (2006.01)
*G06Q 10/04* (2012.01)

(52) U.S. Cl.
CPC .............. *G09B 19/00* (2013.01); *G06Q 10/04* (2013.01)

(58) Field of Classification Search
CPC ........................................................ G09B 19/00
USPC .......................................................... 702/179
See application file for complete search history.

(56) References Cited

U.S. PATENT DOCUMENTS

| | | | |
|---|---|---|---|
| 5,059,127 A | | 10/1991 | Lewis et al. |
| 2003/0101028 A1* | | 5/2003 | Banks et al. ............... 702/189 |
| 2003/0204311 A1* | | 10/2003 | Bush ............................ 702/13 |
| 2004/0073475 A1* | | 4/2004 | Tupper ......................... 705/10 |
| 2004/0153330 A1* | | 8/2004 | Miller et al. .................. 705/1 |
| 2006/0003303 A1 | | 1/2006 | Almond et al. |
| 2006/0041403 A1* | | 2/2006 | Jaber ........................... 702/189 |
| 2006/0141489 A1* | | 6/2006 | Allison et al. ................ 435/6 |
| 2007/0043610 A1* | | 2/2007 | Wang ............................ 705/12 |
| 2009/0132347 A1* | | 5/2009 | Anderson et al. ........... 705/10 |
| 2014/0038155 A1 | | 2/2014 | Weitzman |
| 2019/0236973 A1 | | 8/2019 | Weitzman |

FOREIGN PATENT DOCUMENTS

| | | |
|---|---|---|
| WO | 2006119437 | 11/2006 |
| WO | 2015077708 | 5/2015 |

OTHER PUBLICATIONS

Weber et al., "Estimating regional noise on neural network predictions," Mar. 13, 2003, Pattern Recognition, pp. 2333-2337.*
Park et al., "Bayesian Multilevel Estimation with Poststratification: State-Level Estimates from National Polls," 2004, Political Analysis, pp. 375-385.*

\* cited by examiner

*Primary Examiner* — Ricky Ngon

(57) ABSTRACT

A method is presented for estimating population from sample proportions that produces margins of error narrower for any specific sample size or that requires a sample size smaller for any specific margin of error than do previously existing methods applied to the same data. This method applies an unbiased estimator of the squared correlation between population and sample proportions to determine point and interval estimates of population proportions in a regression context involving simple random sampling with replacement. In virtually all reasonable applications, assuming a Dirichlet prior distribution, the margin of error produced by this method for a population proportion is shown to be 1.96 times the posterior standard deviation of the proportion.

4 Claims, 11 Drawing Sheets

TABLE 1

*Beta Distributions:* $\hat{\pi} \pm 1.96\sigma_{(\hat{\pi}-\pi)}$ *Interval Coverage*

| Mean | Standard deviation ($\sigma_{(\hat{\pi}-\pi)}$) | | | | | | | | | |
|---|---|---|---|---|---|---|---|---|---|---|
| ($\hat{\pi}$) | .005 | .010 | .015 | .020 | .025 | .030 | .035 | .040 | .045 | .050 |
| .05 | .950 | .952 | .954 | .956 | .956 | .953 | .951 | .949 | .948 | .946 |
| .10 | .950 | .950 | .951 | .952 | .953 | .954 | .956 | .956 | .957 | .956 |
| .15 | .949 | .950 | .950 | .951 | .951 | .952 | .953 | .953 | .954 | .955 |
| .20 | .950 | .950 | .950 | .950 | .951 | .951 | .951 | .952 | .952 | .953 |
| .25 | .950 | .950 | .950 | .950 | .950 | .951 | .951 | .951 | .951 | .952 |
| .30 | .951 | .950 | .950 | .950 | .950 | .950 | .951 | .951 | .951 | .951 |
| .35 | .946 | .950 | .950 | .950 | .950 | .950 | .950 | .951 | .951 | .951 |
| .40 | .949 | .950 | .950 | .950 | .950 | .950 | .950 | .950 | .951 | .951 |
| .45 | .951 | .950 | .950 | .950 | .950 | .950 | .950 | .950 | .950 | .951 |
| .50 | 952 | .950 | .950 | .950 | .950 | .950 | .950 | .950 | .950 | .950 |

Fig. 6

TABLE 2

*95% Error Margins for Population Proportions: Three Textbooks*

| Procedure | Estimated proportions and margins of error (±) | | |
|---|---|---|---|
| | Old text | Text: open | Text: choice |
| Frequentist | .29 | .35 | .36 |
| | ±.04 | ±.04 | ±.04 |
| Minimax | .29 | .35 | .36 |
| | ±.04 | ±.04 | ±.04 |
| Fienberg & Holland (1973) | .30 | .34 | .35 |
| | ±.03 | ±.04 | ±.04 |
| Regression ($\pi$ on $P$) | .31 | .34 | .34 |
| | ±.03 | ±.03 | ±.03 |

Note. The frequentist proportions are also the observed proportions ($n = 450$).

Fig. 7

| Error margin* | Bayesian sample size | Conventional sample size |
|---|---|---|
| .030 | 817 | 1067 |
| .035 | 600 | 785 |
| .040 | 475 | 600 |
| .045 | 375 | 475 |
| .050 | 300 | 385 |
| .055 | 250 | 320 |

*In the Bayesian case, the "error margin" is the *critical margin of error.*

Fig. 9

```
┌─────────────────────────────────────────────────────────────┐
│  Before sampling to obtain a Bayesian point estimate of a   │
│  population proportion corresponding to one of a plurality  │
│  of options, pre-specify a margin of error for the estimate │
└─────────────────────────────────────────────────────────────┘
                             ↓
┌─────────────────────────────────────────────────────────────┐
│  Using a computing devise, determine a sample size needed   │
│  to achieve the pre-specified margin of error by simulating │
│  samples of different sizes each yielding a Bayesian point  │
│  estimate equal to the pre-specified margin of error plus a │
│  number equal to one divided by the number of options       │
└─────────────────────────────────────────────────────────────┘
                             ↓
┌─────────────────────────────────────────────────────────────┐
│  Obtain by independent random sampling a sample of the size │
│  that yields the pre-specified margin of error in the       │
│  simulation of the preceding step                           │
└─────────────────────────────────────────────────────────────┘
                             ↓
┌─────────────────────────────────────────────────────────────┐
│  Via a simple regression of the population proportion on    │
│  the corresponding sample proportion using an unbiased,     │
│  classical estimator of the square of the correlation       │
│  between the population and sample proportions for all      │
│  options as the regression coefficient, calculate the       │
│  targeted Bayesian point estimate                           │
└─────────────────────────────────────────────────────────────┘
                             ↓
┌─────────────────────────────────────────────────────────────┐
│  Optionally, depending on whether the data are new or       │
│  existing, estimate the actual margin of error for the      │
│  point estimate calculated in the preceding step via a      │
│  Dirichlet distribution formula or, if the number of        │
│  options is equal to 2, a formula for the standard error    │
│  of estimate                                                │
└─────────────────────────────────────────────────────────────┘
```

Figure 10

Note. Bayesian sample sizes were determined in simulations with increments of 25.

| Sample Sizes Required for Different Error Margins in Bayesian & Classical Estimation of Population Proportions | | | |
|---|---|---|---|
| Error margin | Bayesian one-sided | Bayesian two-sided | Classical (two-sided) |
| .03 | 525 | 825 | 1067 |
| .035 | 400 | 600 | 784 |
| .04 | 300 | 475 | 600 |
| .045 | 250 | 375 | 474 |
| .05 | 200 | 300 | 384 |

POPULATION-SAMPLE REGRESSION IN THE ESTIMATION OF POPULATION PROPORTIONS

CROSS-REFERENCE TO RELATED DOCUMENTS

The present application claims the benefit of U.S. Provisional Application Ser. 60/823,625 filed on Aug. 25, 2006. The prior application is incorporated herein in its entirety by reference.

TECHNICAL FIELD

This patent application relates to the technical field of poll taking, particularly utilizing statistics which encompass the estimation of population proportions from the regression of population on sample proportions. Using an unbiased estimator of the square of the correlation between the population and sample proportions in a Bayesian context produces not only point estimates of the population proportions but also credibility intervals that are narrower than conventional confidence intervals.

BACKGROUND ART

In 1961, James and Stein derived estimators of population means that are more efficient than corresponding traditional estimators by using a linear combination of the mean of an individual sample and the overall mean of the sample aggregated with two or more other samples from possibly different populations. Being within the 0-1 interval, the weight applied to each individual sample mean is called a shrinkage coefficient.

Commenting on the empirical Bayesian treatment of James-Stein estimators by Efron and Morris (1973), Stigler (1983, 1990) showed that the shrinkage coefficient was an estimator of the squared correlation coefficient in the regression of population on sample means. Fienberg and Holand (1973) extended the empirical Bayesian treatment of James-Stein estimators to single-sample population proportions, with the expected increase in efficiency. The method comprising this invention develops an estimator of population proportions even more efficient than the Fienberg-Holland estimator.

DISCLOSURE OF INVENTION

Most easily carried out on a computer, this invention consists of a Bayesian method of using sample data to obtain estimates of population proportions that have a smaller margin of error than the classical method using the same data. The data consist of sample proportions observed in an independent random sample from the population. The population consists of objects such as people or things, and the proportions apply to discrete mutually exclusive and exhaustive options representing choices (e.g., candidates in an election) made by these objects or attributes (e.g., color) describing them. In both the Bayesian and the classical methods, a single sample is obtained from a single population, but the two methods differ conceptually in this respect: In the classical method, the sample is one of a number equal in size that may be drawn from the population whereas in the Bayesian method the population is one of a number from which the sample may have been drawn. The classical method is the conventional one, the one in current common use. The Bayesian method, applied to proportions, is the one comprising this invention, which herein will be referred to simply as the Bayesian method or the Bayesian procedure. Of particular practical value, for a pre-specified margin of error, like 0.03, the Bayesian method requires a smaller sample size than the classical method. Central to the Bayesian method is the squared correlation coefficient, unique to this invention, between population and sample proportions. This coefficient has two main uses in this invention: (a) as the regression coefficient in a regression equation, unique to this invention, that provides a point estimate of a population proportion from its corresponding sample proportion and (b) as a required value for determining the margin of error, unique to this invention, of each population proportion estimated. This invention, which applies only to the estimation of proportions, depends on the special property of proportions that in both populations and samples their mean for K options is equal to 1/K.

BRIEF DESCRIPTION OF DRAWINGS

Providing a more nearly complete understanding of this invention, reference is made to the accompanying drawings, numbered and briefly described below.

FIG. 6, referred to as Table 1 in the following detailed description, shows credibility-interval coverage for ±1.96 standard errors in virtually all applications of the Bayesian method.

FIG. 7, referred to as Table 2 in the following detailed description, compares Bayesian ($\pi$-on-P) with other estimates in a particular example involving three options (K=3).

FIG. 9 compares sample sizes required for Bayesian and classical estimation methods to produce commonly used error margins.

FIG. 10 shows the steps to follow in a-on-P point and interval estimation.

FIG. 11 compares sample sizes required to produce commonly used error margins.

DETAILED DESCRIPTION OF THE INVENTION

Figure 1:
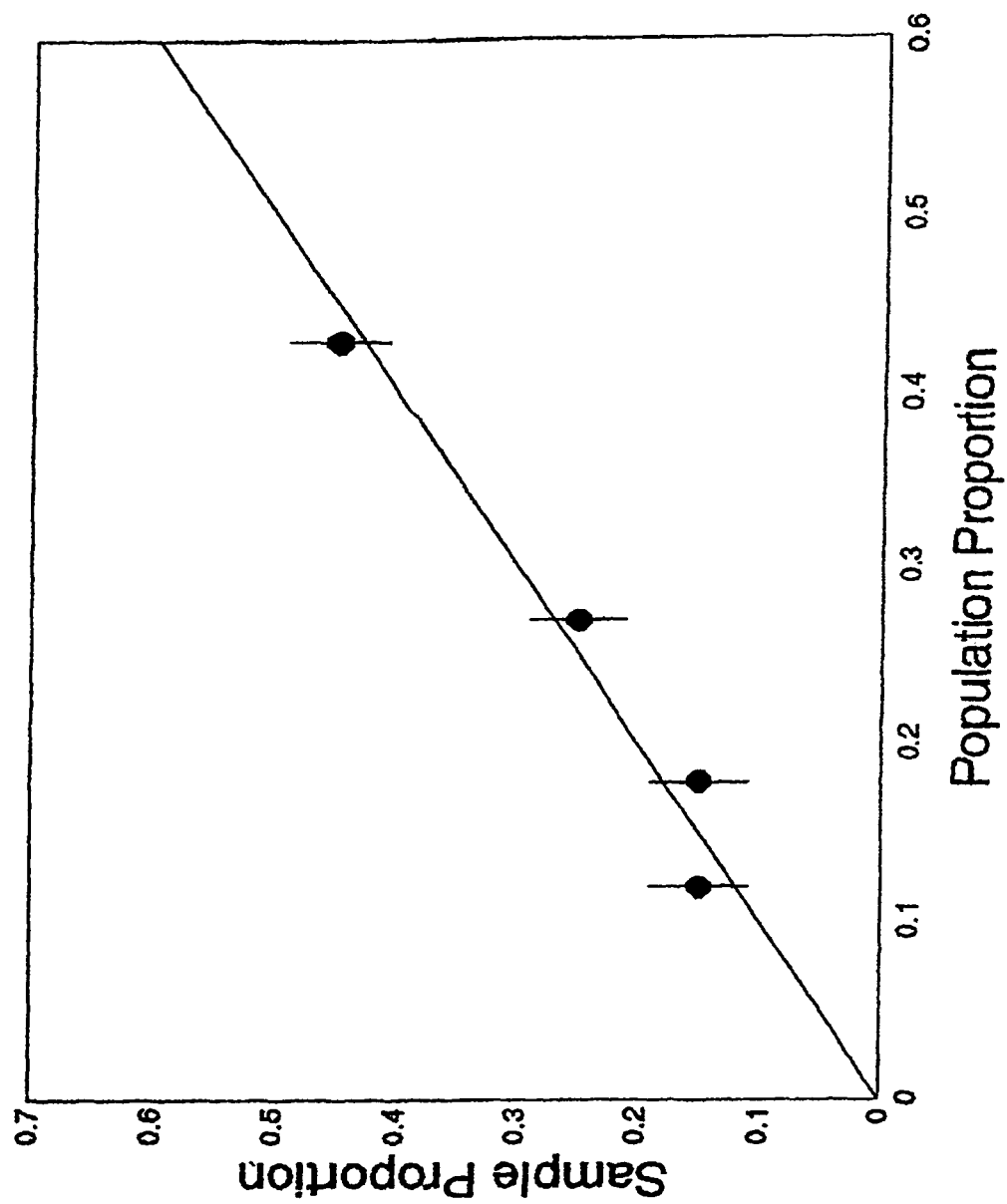
FIG. 1 illustrates the regression of sample proportion P on population proportion x.

Simple regression analysis in statistics is a procedure for using sample data to estimate the linear relationship between a dependent and an independent variable in a population. The sample data targeted by this invention consist of proportions of the objects sampled that fall into discrete mutually exclusive and exhaustive categories (options). Whereas the dependent variable may vary, the independent variable is fixed. For this reason, simple regression can provide a framework for distinguishing Bayesian from classical point estimation. In this case, both the dependent and the independent variables represent the same physical variable (e.g. color), one describing objects in the population and one describing objects in the sample. In classical estimation, the dependent variable describes objects in the sample and the independent variable describes objects in the population; in Bayesian estimation, the opposite is true: The dependent variable describes objects in the population and the independent variable describes objects in the sample. This invention uniquely applies the simple-regression framework to Bayesian estimation of population proportions. The regression coefficient, whose formula is developed here uniquely for this invention, is the squared correlation between the sample and population proportions under study.

The focus here physically is on a single sample obtained from a single population. Conceptually, the sample may be one of many that the population can produce or the population may be one of many that can produce the sample. The first possibility underlies the classical approach and the second the Bayesian approach to statistical inference. The description of this invention herein will present no arguments logically favoring either approach, and certainly the public receiving survey reports or poll results cannot generally distinguish between the two. On practical grounds, however, the presentation here has favored the Bayesian approach in showing that it can lead through regression to considerably more efficient estimation of population proportions than the classical approach.

The method comprising this invention applies strictly to proportions, however described, for example by decimal fractions, proper fractions, and percentages.

Using the preliminary result developed in the next section, the steps which follow describe the method of estimation comprising this invention.

Preliminary Result—The Regression of P on π

The classical approach to point estimation via regression corresponds to the conventional estimation procedure in which, for a sample of size n, nP (an integer) has a binomial or a multinomial distribution with $E_t(P_{kt})=\pi_k$ for each option k of a total of K options, t indexing the sample. The regression expressing this or the Bayesian approach involves, for a single sample t, the means $\mu_P$ and $\mu_\pi$ over options $$\left(\mu_P = (1/K)\sum_{k=1}^{K} P_{kt}\right),$$

the standard deviations $S_P$ and $\sigma_\pi$ over options $$\left(S_P^2 = (1/K)\sum_{k=1}^{K} (P_{kt} - \mu_P)^2\right),$$

and the correlation coefficient $\rho_{\pi P}$ of $P_{kt}$ and $\pi_k$ over options. To assure that $E_t(P_{kt})=\pi_k$, the slope coefficient in the regression $$P_{kt} = \left(\frac{S_P}{\sigma_\pi}\right)\rho_{\pi P}\pi_k - \left(\frac{S_P}{\sigma_\pi}\right)\rho_{\pi P}\mu_\pi + \mu_P + \epsilon_{kt} \quad (1)$$

must be equal to one, the population and sample means ($\mu_\pi$ and $\mu_P$) being equal (to 1/K), so that ($e_{kt}$ denoting sampling error) $P_{kt}=\pi_k+e_{kt}$. Since $E_t(e_{kt})=0$, $E_t(P_{kt})=\pi_k$, as in the traditional binomial or multinomial estimation procedure. The regression implication of $E_t(P_{kt})=\pi_k$ then is that the correlation $\rho_{\pi P}$, between $\pi_k$ and $P_{kt}$ must be equal to the ratio of their standard deviations, $\sigma_\pi$ and $S_P$:

$$\rho_{\pi P} = \frac{\sigma_\pi}{S_P}. \quad (2)$$

This result resembles a basic result of classical mental test theory (Gulliksen, 1950) in which π represents a true and P an observed score. The section following the next one will use this result to obtain a formula for $\rho_{\pi P}^2$.

Step 1—Collection of Data

This invention requires the collection of data consisting of n independently sampled objects falling into K discrete mutually exclusive and exhaustive categories with $P_k$ indicating the proportion of objects falling into category k (k= 1, . . . , K).

Step 2—Computation of $\rho_{\pi P}^2$ from Data

In this as in the previous section, for each option k, $\pi_k$ as the regressed-on variable is assumed to be fixed while $P_{kt}$ can vary over samples t=1, 2, 3, . . . . Ordinarily the exact value of $\rho_{\pi P}^2$ is unknown. Because $P_{kt}$ is a proportion, however, of is expressible in terms of $\sigma_P^2$, the expected value of $S_P^2$, for substitution into $\rho_{\pi P}^2=\sigma_\pi^2/S_P^2$ to yield an estimator of $\rho_{\pi P}^2$ in which $\sigma_P^2$ is replaced by $S_P^2$:

$$S_P^2 = \frac{1}{K}\sum_{k=1}^{K}(P_{kt} - \mu_P)^2 \quad (3)$$

where $\mu_P$ is the mean of the K values of $P_{kt}$ in sample t. (Without further assumptions or conditions, the following derivation leads to the sample estimator of $\rho_{\pi P}^2$ in Equation (13), to which readers wishing to avoid the derivation may now turn.)

In Equation 3, $\mu_P$, equal to 1/R is the population as well as the sample mean proportion so that $S_P^2$, with K rather than (K–1) in the denominator, is an unbiased estimator of $\sigma_P^2$ $$\sigma_P^2 = E_t\left(\left(\frac{1}{K}\right)\sum_{k=1}^{K}(P_{kt} - u_P)^2\right) \quad (4)$$

If $\pi_k=\mu_\pi+\delta_k$, where $$(1/K)\sum_{k=1}^{K}\delta_k = 0, \text{ then } \sigma_\pi^2 = (1/K)\sum_{k=1}^{K}\delta_k^2.$$

As noted in the preceding section, $P_{kt}=\pi_k+e_{kt}$. The expected values of $e_{kt}$ and $\delta_k e_{kt}$ (equal to $\delta_k$ times the expected value of $e_{kt}$) are equal to zero. Substitution first of $\pi_k+e_{kt}$ or $P_{kt}$ and then of $\mu_\pi+\delta_k$ for $\pi_k$ in Equation 4 thus, with $\mu_\pi=\mu_P$, leads to $$\sigma_P^2 = \sigma_\pi^2 + \frac{1}{K}\sum_{k=1}^{K}\sigma_{\epsilon k}^2 \quad (5)$$

where for each option k $\sigma_{\in k}^2$ is the sampling variance $$\sigma_{\in k}^2 = \left(\frac{1}{n}\right)\pi_k(1-\pi_k) \qquad (6)$$

Substitution of $\mu_\pi + \delta_k$ for $\pi_k$ in the mean of Equation 6 over the K values of $\sigma_{\in k}^2$ produces $$\left(\frac{1}{K}\right)\sum_{k=1}^{K}\sigma_{\in k}^2 = \frac{\mu_\pi(1-\mu_\pi)}{n} - \frac{\sigma_\pi^2}{n} \qquad (7)$$

since $$\sum_{k=1}^{K}\mu_\pi \delta_k = \mu_\pi \sum_{k=1}^{K}\delta_k = 0 \text{ and } \sum_{k=1}^{K}\delta_k^2 = K\sigma_\pi^2.$$

Equation 5 thus becomes $$\sigma_P^2 = \sigma_\pi^2 + \frac{\mu_\pi(1-\mu_\pi)}{n} - \frac{\sigma_\pi^2}{n} \qquad (8)$$

or, with $1/K$ for $\mu_\pi$, $$\sigma_P^2 = \sigma_\pi^2 + \frac{(K-1)}{K^2 n} - \frac{\sigma_\pi^2}{n} \qquad (9)$$

Solution of Equation 9 for $\sigma_\pi^2$ finally yields the expression of $\sigma_\pi^2$ in terms of $\sigma_P^2$:

$$\sigma_\pi^2 = \left(\frac{n}{n-1}\right)\sigma_P^2 - \left(\frac{K-1}{n-1}\right)\left(\frac{1}{K}\right)^2 \qquad (10)$$

The formula for $\rho_{\pi P}^2$ is thus $$\rho_{\pi P}^2 = \frac{\left(\frac{n}{n-1}\right)\sigma_P^2 - \left(\frac{K-1}{n-1}\right)\left(\frac{1}{K}\right)^2}{S_P^2} \qquad (11)$$

so that the estimator of $\rho_{\pi P}^2$ involving $S_P^2$ for $\sigma_P^2$ is $$\hat{\rho}_{\pi P}^2 = \frac{\left(\frac{n}{n-1}\right)S_P^2 - \left(\frac{K-1}{n-1}\right)\left(\frac{1}{K}\right)^2}{S_P^2} \qquad (12)$$

or, since $$S_P^2 = (1/K)\sum_{k=1}^{K}P_{kt}^2 - (1/K)^2,$$

$$\hat{\rho}_{\pi P}^2 = 1 - \frac{K\left(1 - \sum_{k=1}^{K}P_{kt}^2\right)}{(n-1)\left(K\sum_{k=1}^{K}P_{kt}^2 - 1\right)} \qquad (13)$$

where $\sum_{k=1}^{K}P_{kt}^2$ is the sum of the squares of the K proportions computed from the sample t to size n.

Equation 12 shows that $\hat{\rho}_{\pi P}^2$ is not only an increasing function of $S_P^2$, and n but also an unbiased estimator of $\rho_{\pi P}^2$, the $S_P^2$ in the denominator being fixed.

Step 3—Point Estimation: Estimation of $\pi$ from P

The regressions underlying the developments in this and the preceding section are opposite in direction. Both involve P and $\pi$. The development in the preceding section considered n as fixed and P as variable. In the development here, however, the reverse is true: P is fixed, and n is variable. In this development, the fixed—$P_k$ sample (k=1, 2, . . . , K) comes from a single population, which is one of any number of possible populations, with their correspondingly different $\pi_k$ values. Although the expected value of a variable $P_k$ is $\pi_k$, the expected value of a variable $\pi_k$ is not $P_k$, but a value $\hat{\pi}_k$ (see below) somewhere between $P_k$ and $1/K$. Whereas the direction of regression assumed in the preceding section worked for the development of a formula for $\hat{\rho}_{\pi P}^2$, the regression direction taken here is particularly appropriate for the estimation of an unknown $\pi_k$, assumed variable, from a known $P_k$, assumed fixed for each option k:

$$\hat{\pi}_k = \rho_{\pi P}\left(\frac{\sigma_\pi}{S_P}\right)P_k - \rho_{\pi P}\left(\frac{\sigma_\pi}{S_P}\right)\mu_P + \mu_\pi \qquad (14)$$

where $\hat{\pi}_k$ is the regression estimate of $\pi_k$, $\rho_{\pi P}$ is the correlation between $P_k$ and $\pi_k$ for the population sampled from, and $\mu_P$ and $\mu_\pi$ are the means and $S_P$ and $\sigma_\pi$ are the standard deviations over options of $P_k$ and $\pi_k$, respectively. Since $\rho_{\pi P}^2 = \sigma_\pi^2/S_P^2$, this equation simplifies to $$\hat{\pi}_k = \rho_{\pi P}^2 P_k - \rho_{\pi P}^2 \mu_P + \mu_\pi \qquad (15)$$

where $\mu_\pi$ is equal to $\mu_P$ so that, with both $\mu_\pi$ and $\mu_P$ denoted by $\mu$, $$\hat{\pi}_k = \rho_{\pi P}^2 P_k + (1-\rho_{\pi P}^2)\mu \qquad (16)$$

or, since $\mu=1/K$, $$\hat{\pi}_k = \rho_{\pi P}^2 P_k + \frac{(1-\rho_{\pi P}^2)}{K} \qquad (17)$$

Estimation of the population proportion corresponding to the observed proportion $P_k$ thus requires knowledge only of $\rho_{\pi P}^2$. If $\rho_{\pi P}^2 = 1$, $\hat{\pi} = P_k$; if $\rho_{\pi P} = 0$, $\hat{\pi}_k = 1/K$. Generally, in practice, $\pi_k$ will be somewhere between $P_k$ and $1/K$.

Since $P_k$ is assumed fixed, substitution of $\hat{\rho}_{\pi P}$ for $\rho_{\pi P}^2$ in Equation 17 yields an estimate of $\hat{\pi}_k$ that is not subject to sampling variation.

Graphical Comparisons and Some Example

Figure 2:
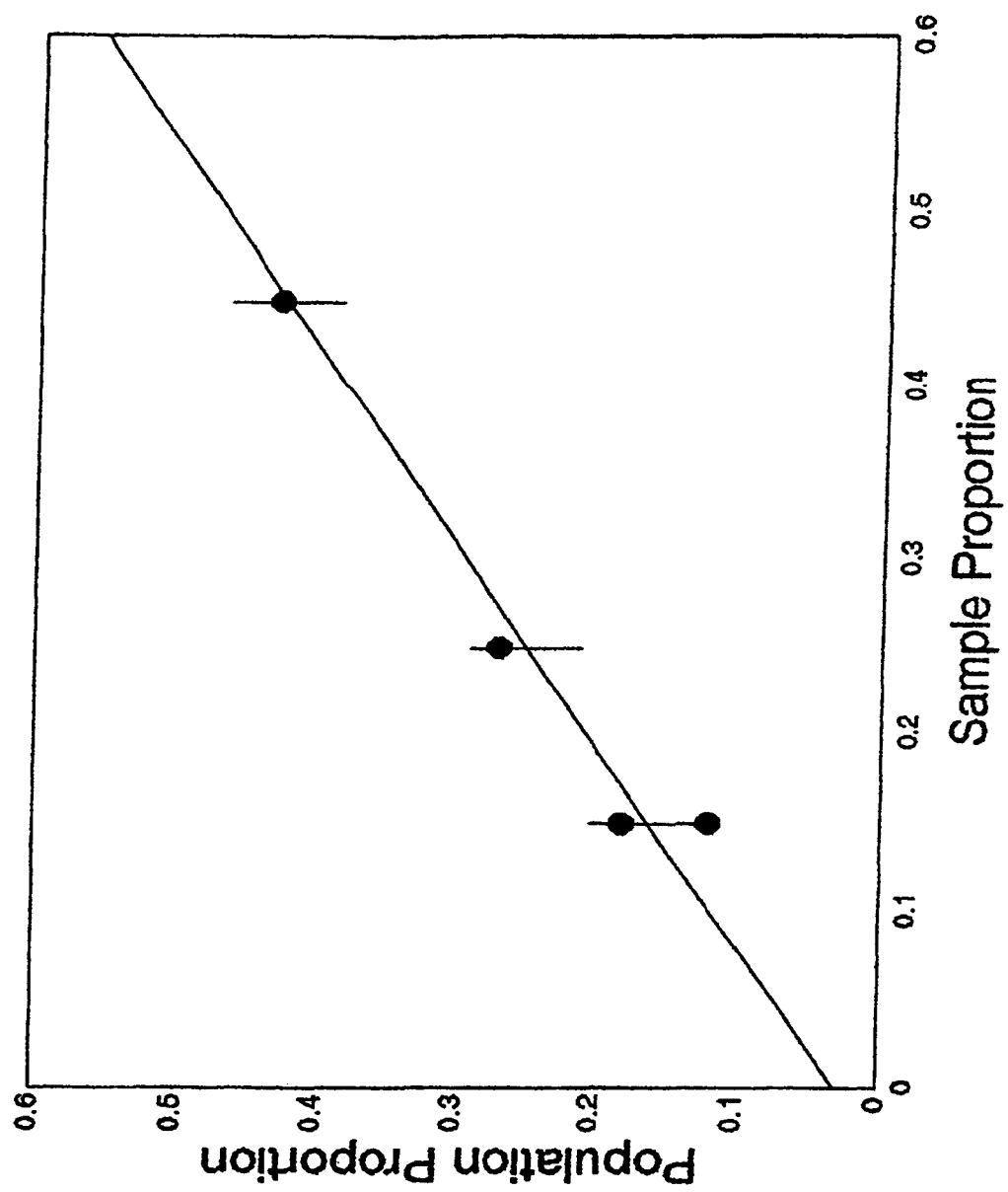
FIG. 2 illustrates to regression of $\pi$ on P.

FIGS. 1 and 2 distinguish between the two forms of population-sample regression. FIG. 1 illustrates the regression of P on $\pi$ and FIG. 2 the regression of $\pi$ on P. In both figures, the population proportions are fictitious since their actual values are unknown. Knowledge of these values is unnecessary, however, because the only requirements for estimation are the sample proportions in FIG. 1 and the regression line in FIG. 2. The vertical lines define 95% confidence or credibility intervals, to be discussed later. Based on n=100, the value of $\hat{\rho}_{\pi P}^2$ is 0.88, the slope of the regression line in FIG. 2. In addition to their different slopes, the two regression lines notably have different intercepts: 0 in FIG. 1 and 0.03 in FIG. 2. Except when $\hat{\rho}_{\pi P}^2 = 1$, $\pi$-on-P (Bayesian) regression produces population-proportion estimates that are greater than zero and less than one.

Two examples provide data to illustrate the Bayesian regression procedure. The first, cited by Tull and Hawkins (1993, pp. 745-746) in the spirit of R. A. Fisher's classic tea-tasting illustration of the Student t-test, was a Carnation taste test comparing Coffee-mate to real cream. Of 285 participants who claimed to be able to distinguish between two cups of coffee presented them, one containing Coffee-mate and the other containing cream, 153 were correct and 132 were incorrect, the corresponding proportions being 0.54 and 0.46. With $\hat{\rho}_{\pi P}^2=0.42$, the corrected proportions were 0.52 and 0.48, respectively. These proportions more strongly than their uncorrected counterparts support the conclusion that people could not tell the difference between Coffee-mate and real cream.

In the second example, a large school district tested three different textbooks for first-year high school algebra. The first was the book used for the past several years; the second and third were new books containing questions taken from recent versions of a statewide mathematics examination. The question format differed in these books, being open-ended in the second and, with a separate question book, multiple-choice (like the statewide examination) in the third. Two hundred students in different classes used each book. Of the 450 students who passed the statewide examination, 130 had used the first book, 158 the second, and 162 the third, the corresponding proportions being 0.29, 0.35, and 0.36. Substituting these proportions, which sum to 1.00, in Equation 13, together with K=3 and n=450 yields 0.48 for the value of $\hat{\rho}_{\pi P}^2$, and using this value for $\rho_{\pi P}^2$ in Equation 17 yields $\hat{\pi}_k$ values of 0.31, 0.34, and 0.34 for the three books, respectively. The first and third values notably differ (by 0.02 each) from their uncorrected counterparts while the second, being closer to the mean of 0.33, shows a difference of only 0.01, to two decimal places. If the books had been equally effective, the expected proportions within the passing group would be equal to 0.33 for students using all three books.

Step 4A—Interval Estimation: Two-option Case

Reported survey results often include half the size of the 95% confidence interval as the margin of error. For K=2, the procedures developed in this article involve intervals different from the conventional ones. The confidence or credibility intervals appropriate for the K=2 procedures developed here are functions of the standard error of measurement, applicable to the regression of P on π, or the standard error of estimate, applicable to the regression of π on P (Kelley, 1923, 1927). Both standard errors involve the assumption of homoscedasticity: Values of the standard errors of measurement are equal for all values of $\pi_k$, and values of the standard error of estimate are equal for all values of $P_k$ (k=1, 2, 3 ..., K). In the case of proportions, as opposed to means of multi-valued variables, this assumption makes sense only when K=2.

Though of less practical value, the standard error of measurement, $\sigma_{(P-\pi)}=S_P\sqrt{1-\rho_{\pi P}^2}$, produces confidence intervals directly comparable to the conventional ones. Estimates of $\sigma_{(P-\pi)}$ are obtainable by using $\hat{\rho}_{\pi P}^2$ for pp in the formula for $\sigma_{(P-\pi)}$.

The Carnation data provide an example. The two uncorrected proportions, 0.54 and 0.46, were inaccurate by an amount equal to ±0.06. As the conventional 95% margin of error, this value (0.06) is 1.96 times the square root of 0.5(1-.5)/285. Use of the standard error of measurement would produce a 95% confidence interval of the same size, to two decimal places. Substituting the value of 0.039 for $S_P$ and the $\hat{\rho}_{\pi P}^2$ value of 0.42 for $\rho_{\pi P}^2$ yields $\sigma_{\pi P}^2=0.030$, or (multiplying 0.030 by 1.96) a 95% error margin of ±0.06.

Confidence intervals determined from the standard error of measurement are directly comparable to conventionally determined confidence intervals because both are based on the assumption of a fixed n and a variable P. The standard error of estimate, applicable in the regression case of a fixed P and a variable π, has the same formula as the standard error of measurement with the exception that $\pi_n$ replaces $S_P$: $\sigma_{(\hat{\pi}-\pi)}=\sigma_n\sqrt{1-\rho_{\pi P}^2}$. Since $\rho_{\pi P}^2=\sigma_\pi^2/S_P^2$, the standard error of estimate will, except when $\rho_{\pi P}^2=1$, be smaller than the standard error of measurement by a factor of $\rho_{\pi P}$. Conceptually, the standard error of estimate should be smaller than the standard error of measurement because the difference (P–π) contains a varying component representing bias that is absent in the difference (π–n). Credibility intervals for a variable n will therefore generally be smaller than corresponding confidence intervals for a variable P. When K=2, the estimate of $\sigma_{(\hat{\pi}-\pi)}$ corresponding to $\sigma_{(P-\pi)}$, is equal to the estimate of $\sigma_{(P-\pi)}$ multiplied by $\hat{\rho}_{\pi P}$.

In the Carnation example, with $\hat{\rho}_{\pi P}^2=0.42$, the standard error of estimate is $\sqrt{0.42}$ times 0.030 (the standard error of measurement), or 0.019, so that the 95% margin of error (1.96 times 0.019) is 0.04. This (rounded from 0.037) is considerably smaller than the conventional error margin of ±0.06. The sample of 285 would, in fact, have to be 417 larger (a total of 702 respondents) to achieve the same ±0.04 margin of error conventionally. Since both the confidence and the credibility intervals overlap the chance proportion of 0.50, the data do not support the claim that tasters can tell cream from Coffee-mate.

For the ±0.04 credibility interval to be comparable to the conventional ±0.06 confidence interval, it must also contain 95% of the area under its frequency curve. The next section will investigate the extent to which this is the case not only here but also more generally.

Question: Do ±1.96 Standard Errors Constitute 95% Credibility Intervals in this Invention?

The answer, generally, is yes, as this section demonstrates.

Corresponding to the assumption of a binomial distribution for sample proportions is the assumption of a beta distribution for population proportions. One distribution is the conjugate of the other. Dirichlet distributions are correspondingly conjugates of multinomial distributions. Such assumptions of conjugate distributions are common in Bayesian analyses (e.g., Good, 1965, Chapter 3). Under the beta-distribution assumption, not only does the ±0.04 credibility interval of the Carnation example contain 95% of the area under its frequency curve but also, as Table 1 shows, $\hat{\pi}\pm1.96\sigma_{(\hat{\pi}-\pi)}$ credibility intervals ranging from ±0.01 to ±0.10 of point estimates (8) between 0.05 and 0.50 will generally contain 95% of possible n values. (No subscript for n is necessary here because a beta distribution involves only two proportions, π and 1–π.) The coverages shown in Table 1 are based on calculations, not Monte Carlo sampling. Table 1 shows confidence-interval proportions for values of not only between 0.05 and 0.50 but also, though indirectly, between 0.50 and 0.95. Because beta distributions having mean values between 0.50 and 0.95 are mirror images of beta distributions having mean values between 0.05 and 0.50, the credibility-interval proportion for $\hat{\pi}$ is equal to the credibility-interval proportion for 1–π, provided that both distributions have equal standard deviations ($\sigma_{(\hat{\pi}-\pi)}$).

Table 1 shows credibility-interval proportions as a function of beta-distribution means and standard deviations because these are the parameters involved in the determination of credibility intervals. Beta distributions, however, are functions of two parameters, a and b, related to beta-distribution means ($\hat{\pi}$) and standard deviations ($\sigma_{(\hat{\pi}-\pi)}$), as follows:

$$a = \hat{\pi}(a+b) \qquad (18)$$

and $$b = (1-\hat{\pi})(a+b) \qquad (19)$$

where $$a+b = \frac{\hat{\pi}(1-\hat{\pi})}{\sigma^2_{(\hat{\pi}-\pi)}} - 1 \qquad (20)$$

For the Carnation data, a+b=(0.52) (1−0.52)/(0.019)²−1, or 690, so that a=0.52 (690), or 359, and b=(1−0.52) 690, or 331, and for these values of a and b the interval between 0.52−1.96(0.019) and 0.52+1.96(0.019) contains 95% of the area under the beta-distribution frequency curve. Table 1 shows this result in the row for 0.50 (close to 1−0.52) and the column for 0.020 (close to 0.019).

The two standard errors, the standard error of measurement and the standard error of estimate, differ not only in the lengths of the confidence or credibility intervals that they produce but also in one other important respect: While the standard error of measurement, computed from $S_P$ and $\hat{\rho}_{\pi P}^2$ (itself a function of $S_P$), is subject to sampling variation due to the possible variation of P for each option over samples, the standard error of estimate does not change because under the Bayesian (π-on-P) assumption governing its use each P remains constant while only n can change for each option. In both these respects, the standard error of estimate is superior to the standard error of measurement for use in the determination of credibility or confidence intervals for population proportions.

The results shown in Table 1 are applicable to Dirichlet as well as beta distributions because a beta distribution describes each Dirichlet proportion if all the other proportions are aggregated as its complement.

Step 4B—Interval Estimation: Case of Two or More Options

The standard error of estimate provides the basis for a common credibility interval, applicable particularly for proportions when K=2. The assumption of a Dirichlet prior distribution for the population proportions makes possible the determination of a different interval for each proportion when K≥3. (When K=2, the two intervals are the same.) If τ designates the total of the parameters of a Dirichlet distribution, then the posterior variance of $\pi_k$ for option k is $$\mathrm{Var}(\pi_k \mid P_k) = \frac{\hat{\pi}_k(1-\hat{\pi}_k)}{n+\tau+1} \qquad (21)$$

where $P_k$ is the observed proportion for option k. Use of this equation, with $\hat{\pi}_k$ being the expected value of $\pi_k$ given $P_k$, requires knowledge of T.

Since $$E(\pi_k \mid P_k) = \frac{nP_k + \tau\mu_\pi}{n+\tau} \qquad (22)$$

for a Dirichlet distribution, the Dirichlet shrinkage coefficient corresponding to $\hat{\rho}_{\pi P}^2$ here is n/(n+τ), and so for the Bayesian (π-on-P) procedure $$\tau_{\pi \mid P} = \frac{n(1-\hat{\rho}_{\pi P}^2)}{\hat{\rho}_{\pi P}^2} \qquad (23)$$

or, from Equation 13, $$\tau_{\pi \mid P} = \frac{K\left(1-\sum_{k=1}^{K}P_k^2\right)}{K\sum_{k=1}^{K}P_k^2 - 1 - (K-1)/n} \qquad (24)$$

According to Fienberg and Holland (1973), the minimax value of τ is $\sqrt{n}$ and the maximum-likelihood estimator of τ is $$\tau_{ML} = \frac{K\left(1-\sum_{k=1}^{K}P_k^2\right)}{K\sum_{k=1}^{K}P_k^2 - 1} \qquad (25)$$

Using the values of τ computed from Equations 24 and 25 as well as $\sqrt{n}$ in Equations 22 and 21 with data from the three-textbook example presented earlier produced the point estimates and margins of error shown in Table 2, which includes corresponding classical (frequentist) results.

Illustration of Three-Option Case

Table 2 shows test-passing proportion estimates and error margins for the three different textbook groups determined in the four different procedures, corresponding in the case of the non-classical procedures to their different values of τ: 21, 232, and 487, respectively, for minimax, Fienberg and Holland, and Bayesian (π-on-P). The Bayesian (π-on-P) procedure produced the narrowest margins of error. This result is not surprising since, as Equations 24 and 25 make clear, $\tau_{\pi \mid P} > \tau_{ML}$, the difference diminishing as n gets large. According to Equation 23, the τ for the minimax procedure ($\sqrt{n}$) will also be smaller than $\tau_{\pi \mid P}$, unless $\hat{p}_{\pi P}^2/(1-\hat{p}_{\pi P}^2) \geq \sqrt{n}$, which is not the case here. Since the standard errors of the three non-classical procedures ranged between 0.01 and 0.02, the credibility intervals, as Table 1 shows, all have approximately 95% coverage.

Depending on which of the four estimation procedures they used, investigators looking at the study's results might come to entirely different conclusions. Since the confidence or credibility interval for the old textbook lies below 0.33 in all but the Bayesian (π-on-P) procedure, investigators using the three other procedures might conclude that the old textbook was less effective than the two new ones. An investigator using the Bayesian (π-on-P) procedure, however, would not reach that conclusion. All three credibility intervals produced by that procedure, despite being generally narrower than the others by 0.02, contain the chance proportion 0.33. The conclusion following from this result is that further study is necessary before selecting a textbook for general use.

Comparison of Methods in the Two-Option Case

Figure 3:
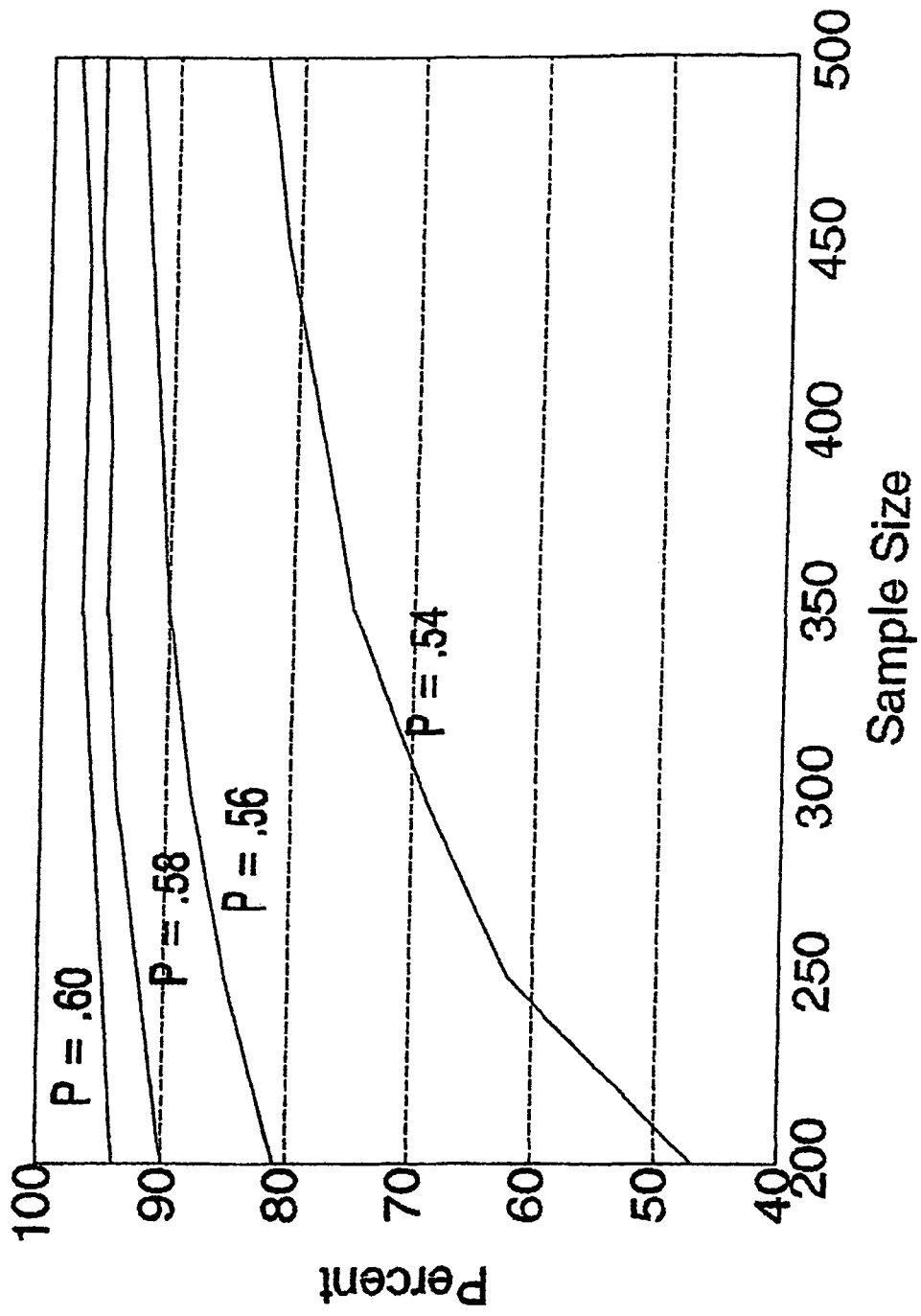
FIG. 3 illustrates Bayesian as a percent of classical error margins in the two-option case (K=2).
Figure 4:
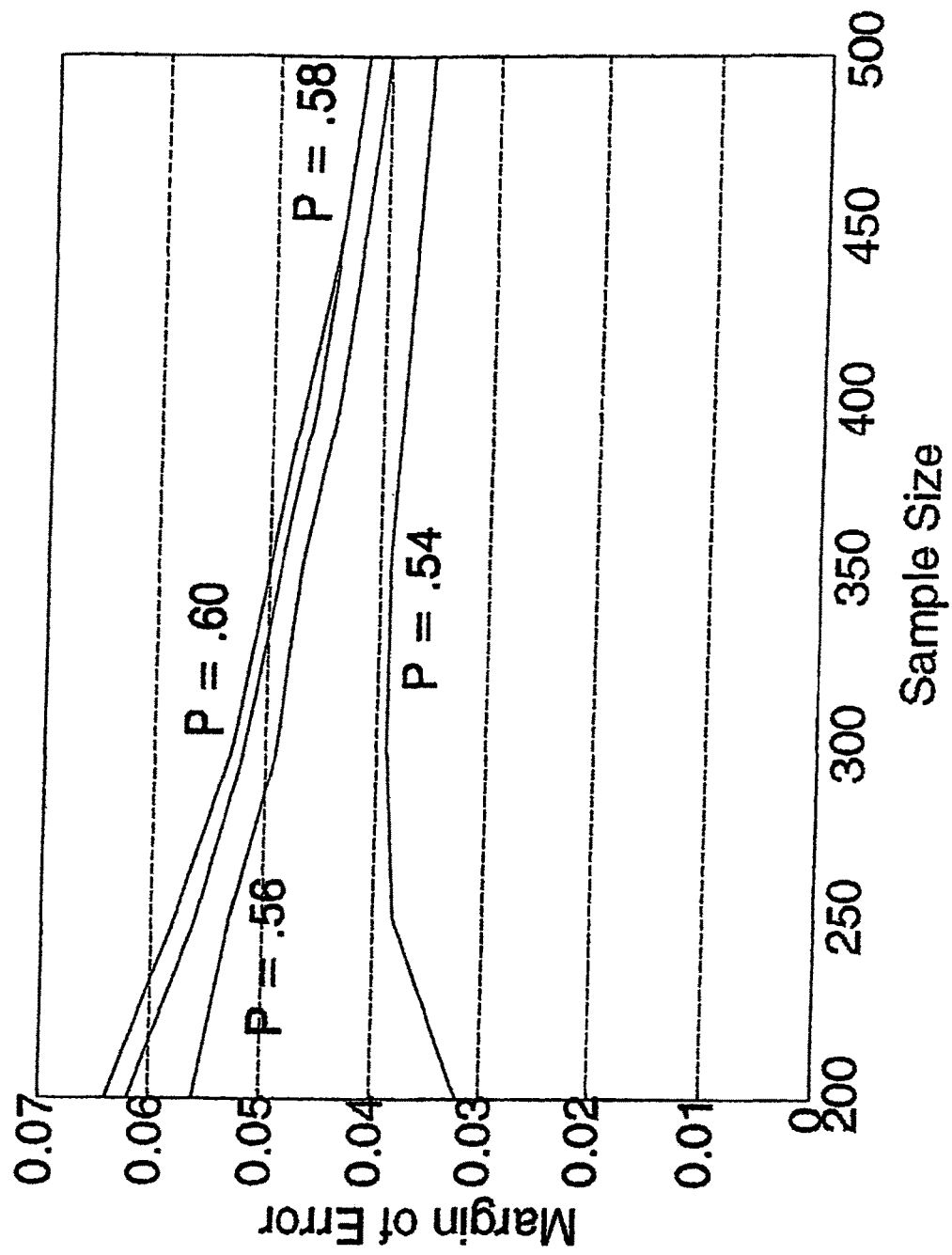
FIG. 4 illustrates Bayesian error margins in the two-option case.

FIGS. 3 and 4 provide a broader view of the classical and Bayesian (π-on-P) regression procedures. Limited to K=2, these figures show for a range of sample sizes and P values Bayesian margins of error as percents of frequentist margins of error (FIG. 3) and actual Bayesian margins of error (FIG. 4). The three high curves in each figure represent high $\hat{p}_{\pi P}^2$ values, approaching one for n=500, while the bottom curve (for P=0.54) represents a comparably low $\hat{\rho}_{\pi P}^2$ value. When $\hat{\rho}_{\pi P}^2$ is high, Bayesian and classical margins of error are very nearly equal, as are corresponding point estimates; when $\hat{p}_{\pi P}^2$ is low, Bayesian margins of error are low and point estimates are close to the mean, relative to their classical counterparts. For P values that are very close to the mean, $\hat{p}_{\pi P}^2$ can be so low that Bayesian point estimates are for all practical purposes equal to the mean, with margins of error effectively equal to zero. This is the case for P=0.52 when n≤500.

Is the Method Comprising this Invention an Empirical or a Purely Bayesian Procedure?

In regressing the observed proportion P toward the mean, 1/K, the squared correlation $\hat{p}_{\pi P}^2$ resembles the shrinkage coefficient w in Fienberg and Holland (1973) or 1-B in Efron and Morris (1973) and Morris (1983). Because the developments using w or 1-B involve empirical Bayesian estimation, this resemblance suggests that π-on-P regression may also be empirical Bayesian. That is not the case, however.

The π-on-P procedure is a regression, not an empirical Bayesian, procedure. The difference is important. While estimates in both the π-on-P and the Fienberg and Holland (1973) procedures are expected values of π given P, both π and P may vary in empirical Bayesian estimation while only n may vary in estimation by π-on-P regression. If P as well as n were to vary in π-on-P regression, then the credibility intervals computed from the standard error of estimate or Equation 21 would be too small, as the coverage proportions in Table 1 would be too large. The more apt comparison is with pure Bayesian estimation because in both this and π-on-P regression P is fixed while only n may vary. As Dempster (1983) noted in his commentary on Morris (1983), Morris and other empirical Bayesians "break the [Bayesian] egg but do not enjoy the omelette." Because the regressed-on variables are fixed in regression estimation, the coverage proportions in Table 1 and their corresponding credibility intervals are accurate, and the π-on P regression of this invention is a purely (not an empirically) Bayesian procedure.

Shrinkage Coefficients as Slope Coefficients in Regression

Shrinkage coefficients may be interpretable as slope coefficients in regression. Stigler (1990) made this observation in relation to the work originated by James and Stein (1961), involving means. The squared correlation $p_{\pi P}^2$ is in fact the single-sample binary (0-1) data counterpart of the the multi-sample shrinkage coefficient 1-B cited by Morris (1983) under the empirical Bayes assumption of normal distributions for both sample and population means. If for m samples, with m>2, $\sigma_{(\overline{X}-\mu)}^2$ and $\sigma_\mu^2$ are the respective variances of these distributions, then, according to Morris, $1-B=\sigma_\mu^2/(\sigma_\mu^2+\sigma_{(\overline{X}-\mu)}^2)$, which is the square of the correlation between y and $\overline{X}$. In view of Equations 24 and 25, the shrinkage coefficient w in the Fienberg and Holland (1973) procedure is a consistent estimator of the squared correlation between π and P, the shrinkage coefficient developed here ($\hat{p}_{\pi P}^2$) being an unbiased estimator of it.

In the James-Stein case, $\sigma_{(\overline{X}-\mu)}^2=1$ so that the risk function of the traditional estimator $\overline{X}$ is equal to one for each value of μ. If μ has a normal distribution, then the posterior variance of μ given $\overline{X}$ is equal to 1-B and, as Efron and Morris (1973) observed, the risk function of the estimator (1-B), $\overline{X}$ which is the posterior mean of μ given $\overline{X}$ assuming μ to have a mean of zero, is smaller than the risk function of $\overline{X}$ by an amount equal to B. The estimator $(1-B)\overline{X}$ is the James-Stein estimator if B is replaced by $$(m-2) \Big/ \sum_{i=1}^{m} \overline{X}_i^2,$$

whose expected value is equal to B because, with $\sigma_{(\overline{X}-\mu)}^2=1$ and 1/B the variance of $$\overline{X}, B\sum_{i=1}^{m} \overline{X}_i^2$$

has a $X_m^2$ distribution with negative first moment equal to 1/(m-2). The James-Stein shrinkage coefficient $$1 - (m-2) \Big/ \sum_{i=1}^{m} \overline{X}_i^2$$

is interpretable as an unbiased estimator of the square of the correlation between μ and $\overline{X}$, or as an unbiased estimator of the slope coefficient in the regression of μ on $\overline{X}$, the intercept being equal to zero.

Since $\hat{\rho}_{\pi P}^2$ is also an unbiased estimator, it corresponds in single-sample proportions estimation to the James-Stein shrinkage coefficient in multi-sample means estimation.

Bayesian Versus Conventional Error Margins

Figure 8:
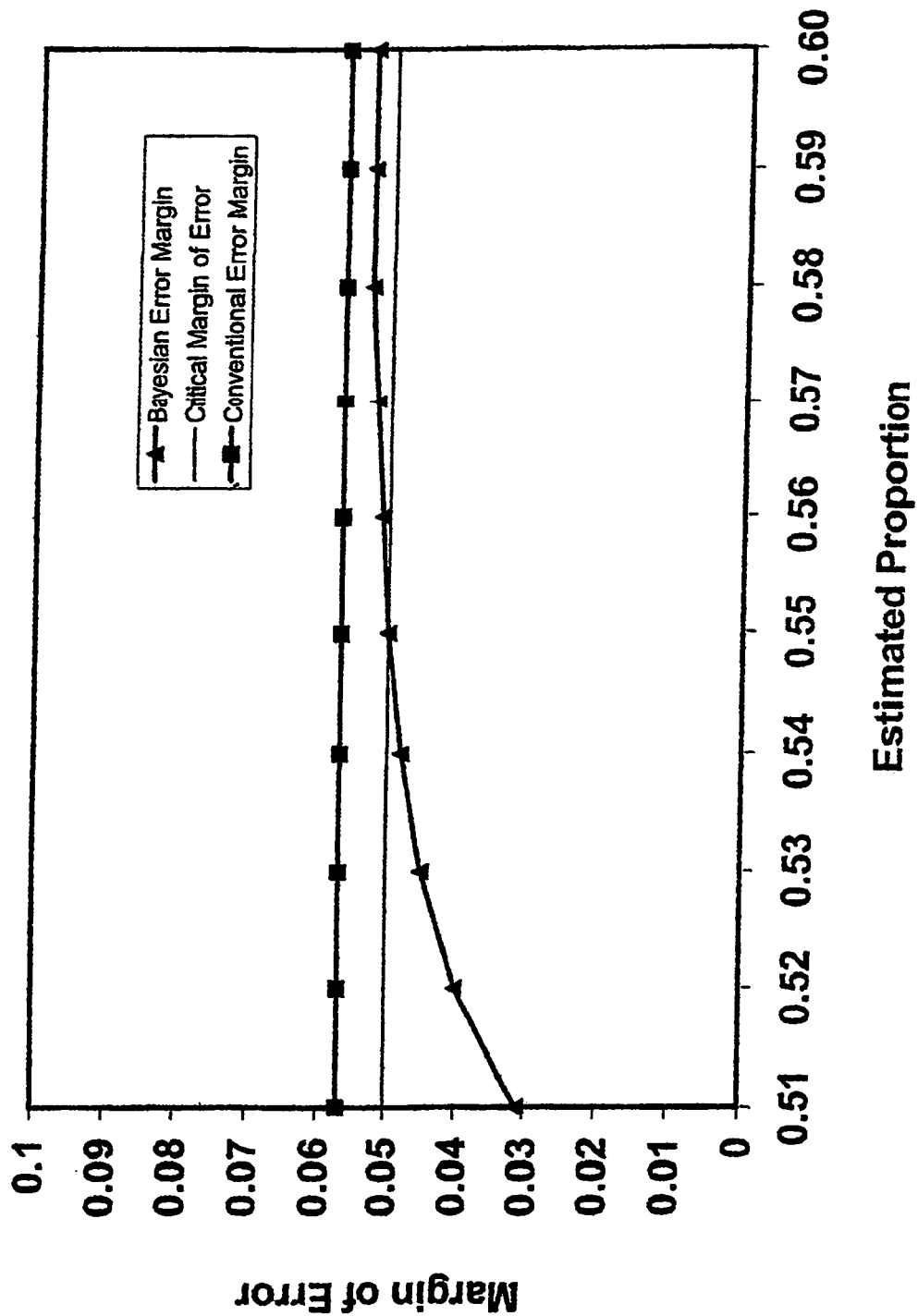
FIG. 8 compares "critical" Bayesian with classical margins of error for two options (K=2) and a sample size of 300 (n=300).

The use of Bayesian estimation of population proportions, which is the method comprising this invention, requires an amended definition of margin of error. In classical estimation, the margin of error depends only on sample size. In Bayesian estimation, the margin of error for a population proportion varies not only with sample size but also with the estimated population proportion. Called the critical margin of error, the Bayesian margin of error X, chosen in advance, is the one for an estimated population proportion equal to Y+1/K or to Y−1/K and a sample size that will make X equal to Y. An estimated population proportion equal to X+1/K or X−1/K will then represent a non-chance difference from 1/K with a margin of error equal to X. In the two-option case (K=2) for a sample size of 300 (n=300), the margin of error (V will be equal to 0.05 for a Bayesian-estimated population proportion of 0.55 (0.05+0.50), as illustrated in FIG. 8. In this case, the conclusion from obtaining a Bayesian estimate equal to or greater than 0.55 is that the population proportion is within the interval of 0.55 plus or minus 0.05 or, in other words, that the population proportion is marginally larger than 0.50. Generally, the sample sizes needed to achieve equal classical and a critical margins of error will be smaller in Bayesian than in classical estimation.

For classical and Bayesian estimation of population proportions, FIG. 9 shows a table that compares sample sizes required to produce commonly used error margins. In the case of Bayesian estimation, the error margins are critical margins of error. For every error margin, Bayesian estimation requires a smaller sample than classical estimation.

Application of Bayesian regression to survey design and analysis. So far, this presentation has shown that the regression of population on sample proportions constitutes Bayesian estimation of population proportions, while demonstrating how to perform this estimation on existing data. To apply this procedure to the conduct of a survey, what is needed is a method to determine the sample size n required to achieve a desired margin of error. In conventional or classical estimation, the method involves the use of a simple formula: n=0.96/m2, where m designates the desired margin of error. For a margin of error equal to 0.03, for example, n=0.96/(0.03)2, or 1,067. This simple determination of sample size is possible because n is a function only of m in conventional estimation. Unfortunately, in Bayesian estimation, the sample size is a function of two variables, the desired margin of error and the yet-to-be-observed sample proportion, which is itself a function of $\rho^2\pi P$ and n, as shown in the following equation for $\rho^2\pi P$ with K=2 (two options):

$$\rho_{\pi P}^2 = 2(\sqrt{((n-1)m^2)^2 + nm^2} - (n-1)m^2)$$

Substituting a constant value (like 0.03) for m and successive integer values of n in this equation, while at each simulation using the resulting value of $\rho^2\pi P$ to determine the actual margin of error, until reaching the value of n that yields an actual error margin that is equal to the desired one (m) leads to the determination of the required sample size. This process is performed with use of a computer.

Figure 5:
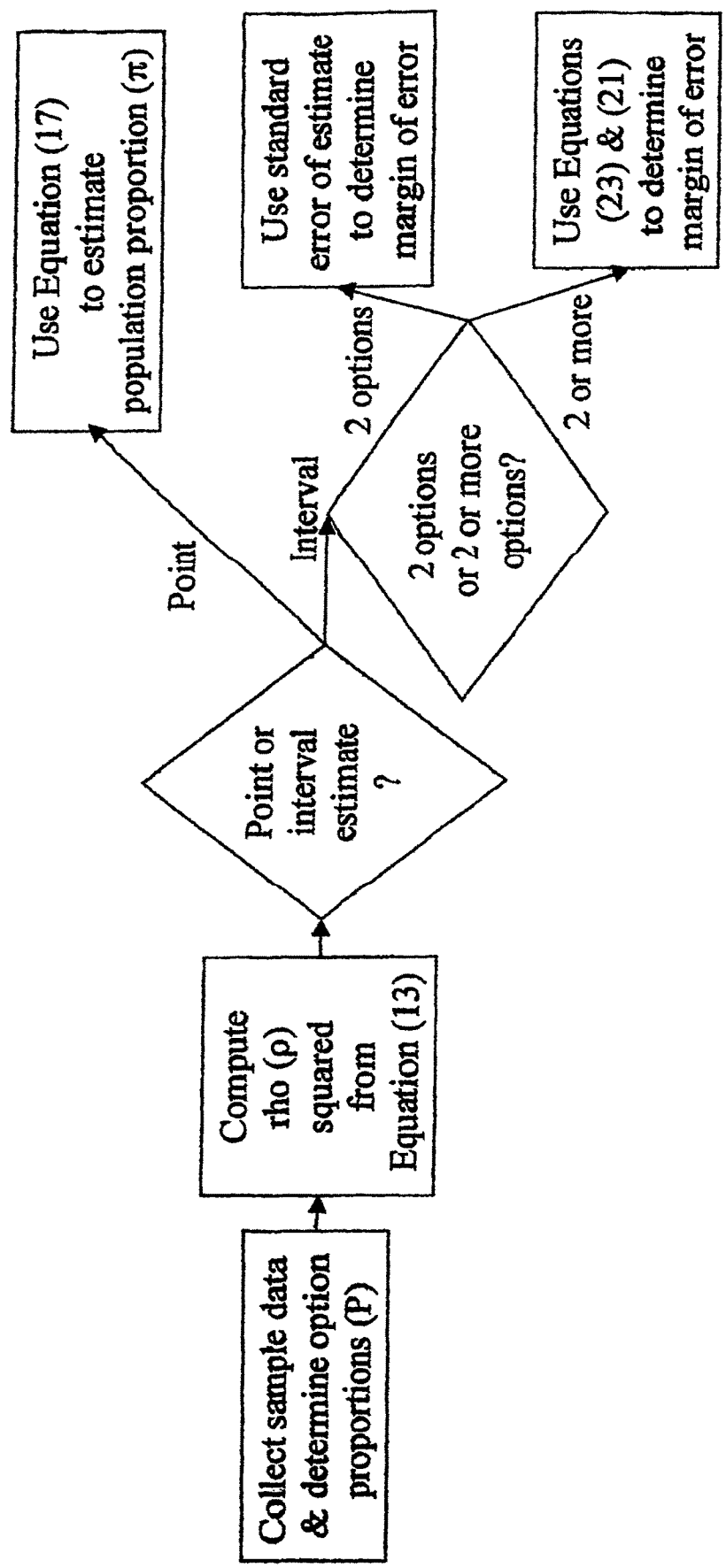
FIG. 5 shows the steps to follow in Bayesian point and interval (margin-of-error) estimation. The equation numbers refer to the equations included in the following detailed description of the invention.

The first (left-hand) box in the flow chart in FIG. 5 should be expanded as shown in the following flow chart of FIG. 10 to describe in increased detail how this invention applies to the development and analysis of new data in the conduct of a survey, as well as to existing data.

One-sided vs. two-sided margins of error. In conventional estimation, the margin of error is half the distance between two boundaries that contain between them 95 percent of outcomes that could occur by chance. That is necessary because in this estimation the chance outcomes could occur with equal probability on either side of the null population value (equal to 0.50 when estimating probabilities with K=2). The occurrence of an observation outside the error range between the two boundaries nullifies that population value (meaning, when K:=2, the population value is not equal to 0.50). The same necessity does not exist in Bayesian estimation, however, because in this case the observed value is considered fixed, meaning it cannot be on the other side of the null value, and the error range needs only a boundary between the observed value and the vicinity of the null value, the distance between the Bayesian-estimated value and the boundary being the margin of error (0.03, for example). Nullification occurs when the null value (0.50 when K=2) is outside this error range. A one-sided error range has a distinct advantage over a two-sided one, which divides the 5 percent nullification values into two equal 2.5 percent parts, one on either side. In the case of a one-sided error range, all the 5 percent nullification values are on one side, the side where the null value is. A sample that has 5 percent of nullification values outside an error-range boundary must be smaller than one that has 2.5 percent there. That means a smaller sample will produce any desired margin of error in the one-sided than in the two-sided case. This sample-size advantage is in addition to the one that Bayesian estimation has in the case of two-sided error ranges. The table in FIG. 11 provides an illustration for selected margins of error. This table is an expansion of FIG. 9, with the inclusion of an additional column showing sample sizes for a survey that uses one-sided Bayesian analysis.

This invention, which may be practiced without any element not specifically disclosed herein, has been described particularly with respect to certain preferred embodiments and features; however, those of ordinary skill in the art should be able to see that various modifications in form and detail may be made without departing from its spirit and scope.

I claim:
1. A method comprising:
specifying a desired margin of error for a Bayesian point estimate of an actual population proportion of individuals choosing a particular one of a plurality of options;
determining a sample size needed to achieve the desired margin of error by simulating samples of different sizes, each yielding a margin of error as a function of the desired margin of error and the number of the plurality of options, the determined sample size being the one yielding the desired margin of error;
obtaining from a population of individuals each choosing one of the plurality of options an independent random sample of the size determined to yield the desired margin of error; and
converting the sample proportion of individuals choosing the particular one of the plurality of options into a Bayesian point estimate of the population proportion choosing the particular one of the plurality of options by a simple regression of the Bayesian point estimate on the sample proportion which, as the conventional point estimate of the population proportion, requires a larger sample size than the Bayesian point estimate to achieve the desired margin of error.

2. The method according to claim 1, wherein the simple Bayesian regression requires only the sample proportions across the plurality of options, the number of the plurality of options, and the determined sample size to achieve the converting.

3. The method according to claim 1, wherein a reciprocal of the number of the plurality of options is outside the desired margin of error, which extends from the Bayesian point estimate in a direction of the reciprocal of the number of the plurality of options, only if a distance between the Bayesian point estimate and the reciprocal of the number of the plurality of options is greater than the desired margin of error.

4. A process comprising:
specifying a desired margin of error for a poll comprising a plurality of options;
determining a sample size needed to achieve the desired margin of error by simulating samples of different sizes, each yielding a margin of error as a function of the desired margin of error and the number of the plurality of options;
polling an independent random sample of the sample size;
converting a proportion of individuals choosing a particular one of the plurality of options in the poll into a Bayesian point estimate of the population proportion choosing the particular one of the plurality of options by a simple regression of the Bayesian point estimate; and
presenting results of the poll, wherein the sample size is less than a sample size required to produce the desired margin of error without the simulating and the converting.

* * * * *